July 24, 1934.    J. T. ROBINSON ET AL    1,967,262
MACHINE FOR GROOVING FIBROUS BOARD
Filed Dec. 23, 1931    2 Sheets-Sheet 1
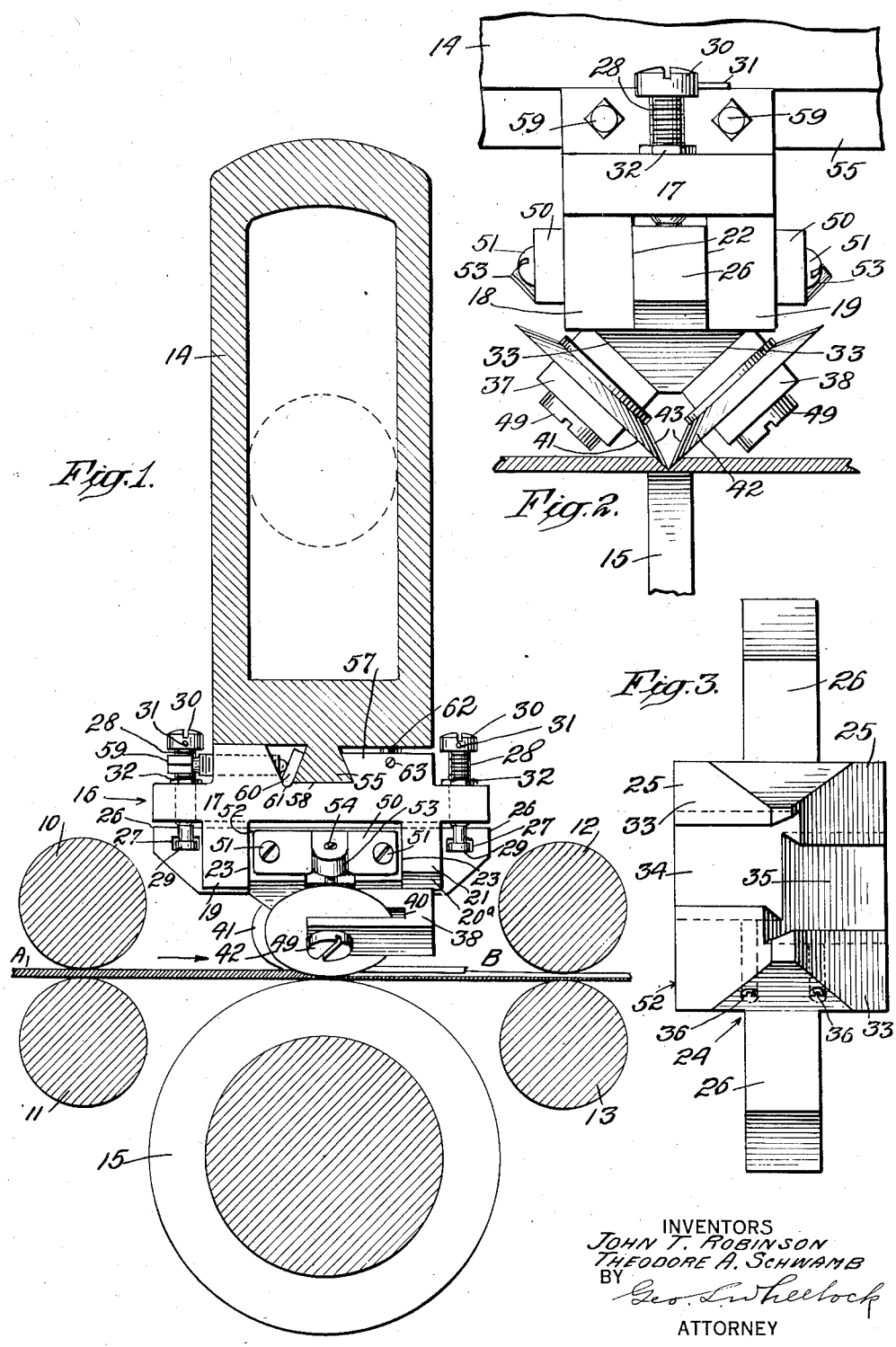
INVENTORS
JOHN T. ROBINSON
THEODORE A. SCHWAMB
BY
Geo. L. Wheelock
ATTORNEY

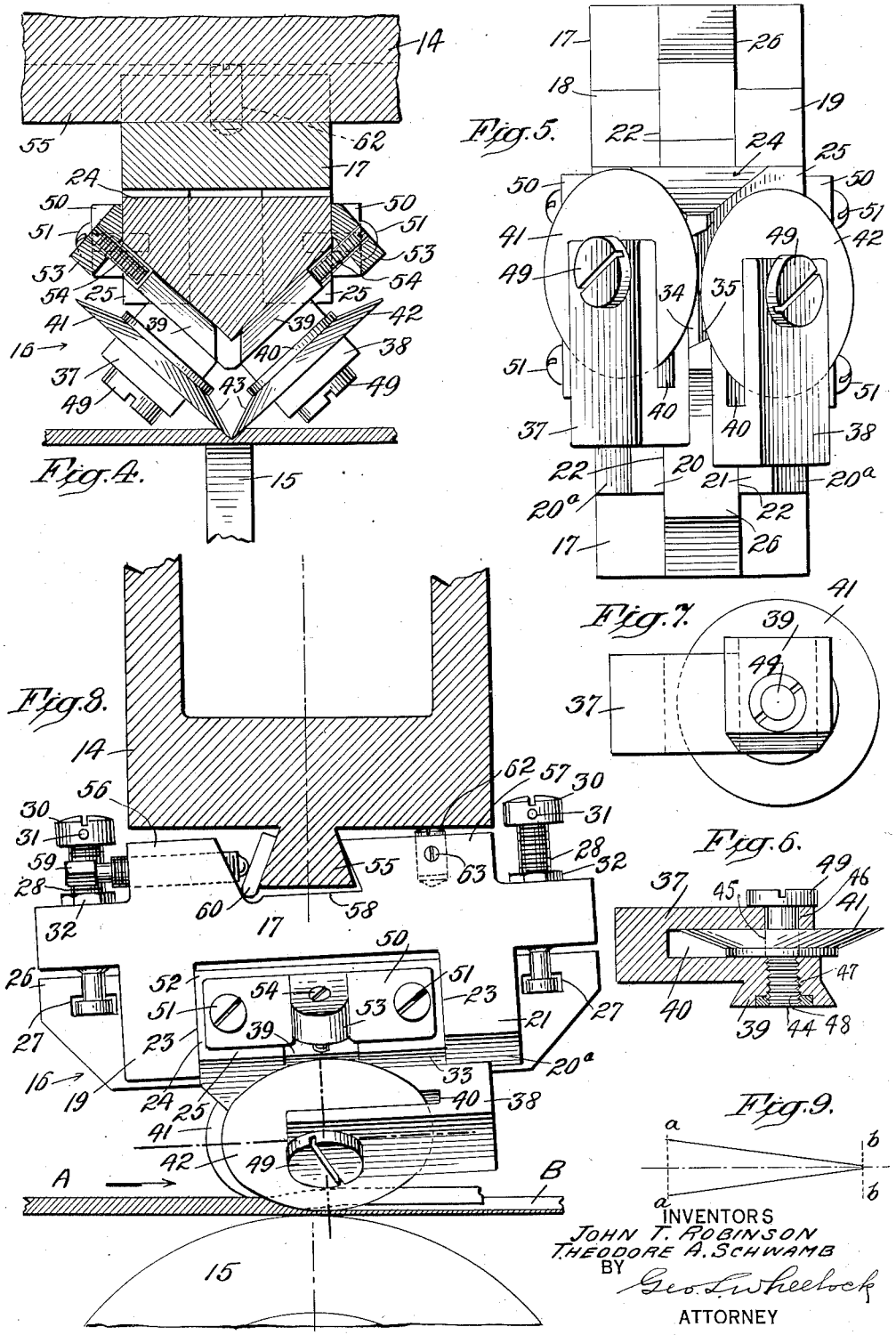

Patented July 24, 1934

1,967,262

UNITED STATES PATENT OFFICE 1,967,262

MACHINE FOR GROOVING FIBROUS BOARD

John T. Robinson and Theodore A. Schwamb, Boston, Mass.

Application December 23, 1931, Serial No. 582,788

14 Claims. (Cl. 164—69)

The present invention relates to means for producing grooves in fibrous board, which is thick enough to be so grooved, the general objects of the invention being to cut grooves in board of suitable thickness preferably to enable the board, if bendable to be bent at angles which may be defined and determined quite approximately by the shapes and depths of the grooves, such board being therefore adapted to be bent into shapes so as to form hollow or body portions of boxes or any other shapes to which the board is adapted, such board usually being laminated paper board. The board may be of any suitable materials laminated to the desired thickness, and which in the case of its ultimate use in making paper boxes need only be of laminated material of sufficient strength and thickness to keep itself substantially intact for being set up into boxes, such as cigar, candy and any other boxes for which fibrous or paper board is adapted to be used, whether the grooved board is bent one way or the other. The grooved board may be used entirely flat for other purposes.

One of the specific objects of the invention preferably is to cut a V-shaped groove in heavy or thick fibrous bendable board, so that when the board is folded with the groove located on the inside, it will fold to any suitable angle, preferably a right angle, and leave no substantial openings or spaces inside of the fold, inasmuch as it is preferred that the side walls of the groove abut against each other, thereby forming a mitre joint along the line of the original groove.

A further specific object of the invention may be, and preferably is, to cut intersecting grooves in fibrous board so that with a suitable number of cutting units, two pair of parallel grooves may be cut each time so that when the cut blank is folded up, there is readily formed four sides of an open or hollow box-body.

When it is desired to obtain corners of boxes or other articles, which corners shall be formed at the desired angles, preferably right angles, and no more or no less, there is need for adjustment in the cutting units so as to enable this to be done with different types of fibrous board and where there are different directions of grain in the same board. Furthermore, it has been found in practice that the cutting units should have their knives or cutters set in proper relation to each other so that they will cut out the waste quite cleanly. Furthermore, it has been found that owing to the fact that fibrous boards to be cut differ in structure and toughness of material, the cutting edges of the two knives of each cutting unit, though running very close to each other with a slight lateral spacing, should not touch and dull each other, as is apt to be the case in cutting some fibrous board which is tougher than other board, and may be the case in cutting boards of most any degree of toughness.

The preferred construction and operation of the parts of each cutting unit, if so desired, is such that the same lends itself to a tilting or tipping of the whole unit, with a view to adapting the cutters to tend to pull apart instead of having a tendency to draw together and damage each other, as by dulling the cutters, and as such a type of cutting unit is desirable in these connections, the invention in this respect resides in the combination of a board supporting roller, a cutter support, a pair of opposed, rotary, disk-cutters arranged in planes intersecting the roller and convergingly toward the roller so as to cut along the path taken by the board, and means for adjusting and setting the cutters with respect to their support so that in operation their closest points laterally lie across the line of a groove to be cut and substantially in planes with that of the axis of the roller or in planes inclined to aforesaid axial plane.

These being preferably among the objects of the invention, together with others, the invention consists of certain features of construction and combinations of parts to be hereinafter particularly described and then claimed with respect to the accompanying drawings illustrating an embodiment of the invention and wherein Fig. 1 is a sectional view of a simple type of machine to which one of the cutting units shown in operation is adapted to be applied;

Fig. 2 is an end elevation of a cutting unit applied to parts of the machine which are shown as broken away;

Fig. 3 is a plan of the slide member or block on which the cutters are to be mounted;

Fig. 4 is a transverse sectional elevation on the line 4—4, Fig. 1, the parts being enlarged to the size of Fig. 2;

Fig. 5 is an underside plan of one of the cutting units;

Fig. 6 is a partial section through the cutting unit to show how the cutters are mounted adjustably upon slide member of Fig. 3;

Fig. 7 is a detail elevation of one of the cutters and its individual slide member;

Fig. 8 is an enlarged view, similar to Fig. 1, to illustrate a tipped or tilted position of the cutting unit with respect to the parts; and Fig. 9 is a diagrammatic view to partially illustrate what occurs in cutting a groove, when the cutting unit is tilted in Fig. 8.

Referring to Figs. 1, 2 and 4 of the drawings, it is assumed that a machine having a suitable frame is provided with a pair of steel feed rollers 10, 11, together with another pair of steel feed rollers 12, 13, these rollers being all parallel the one with the other, so as to feed a fibrous or paper board evenly in the line of feed, which is at right angles to the axes of the rollers. Upon the frame of the machine there is supported a beam or supporting bar 14 of suitable length, and parallel with the feed rollers, such being preferably mounted at each end upon trunnions which are indicated by the dotted circle in Fig. 1, so that the beam may be given a half turn so as to dispose the cutting units which are mounted thereupon in one direction or the other, according to the position in which the cutting units do their work upon the board, or in a reverse position, so that they are accessible for mounting them upon the beam or for the adjustment of the parts of the units. Upon the frame of the machine there is also mounted a roller or disk 15, the axis of which is parallel with the axes of the feed rollers 10, 11, 12, 13, it being located intermediate of the two pairs of feed rollers, and while the feed rollers are positively driven, preferably the roller or disk 15 runs idle.

Referring to Figs. 1 to 6 inclusive, there is illustrated a single cutting unit 16 which is mounted upon the beam or bar 14, but it is to be understood that in practice, and particularly when intersecting grooves are to be cut in fibrous board, a number of the cutting units are mounted similarly to the illustrated unit. In such case it is preferred that the beam or supporting beam 14 carry one pair of cutting units similar to the unit 16 for cutting a pair of parallel grooves in one direction and that at another location on the beam another pair of such cutting units is provided so as to cut a pair of grooves intersectingly with the grooves referred to, whereby to enable blanks to be grooved for use in making boxes, but of course the number of cutting units may be varied according to the nature and construction of the article to be ultimately produced from the grooved fibrous board. The parts of the cutting unit 16 are made of hard metal, preferably steel.

The cutting unit 16 includes a unitary block-body or stock 17, and which is suitably recessed to provide a pair of posts or legs 18, 19 and another pair of posts 20, 21. The posts of each pair 18, 19 and 20, 21 are separated by spaces 22 which extend lengthwise of the stock 17, and the two separate pair of posts are separated by spaces 23 which extend at right angles to the spaces 22. The inner walls of all of the posts or legs extend parallel with each other, the posts extending at right angles to the main plane of the stock 17.

A slide member 24 having parallel sides extending lengthwise thereof is movably fitted between the opposed inner faces of the posts 18, 19 of one pair and the posts 20, 21 of the other pair, and is provided at opposite sides with laterally extending wing portions 25 which are located in the spaces 23 between two posts at the respective sides of the stock or body 17. Said member 24 also has extensions 26 which are arranged at right angles to the lateral wing portions 25 and are guided in the spaces 22 between the posts of each pair. Inasmuch as the surfaces of the posts which are opposite to the member 24 are parallel with each other, the opposed faces of the lateral portions 25 and the extensions 26 are also parallel with each other and with the said surfaces of the posts. The fit is quite a snug one, so that the slide member 24 can be adjusted in its own plane parallel with the main plane of the body or stock 17.

The extensions 26 of the slide member 24 are provided in those faces which are opposite to the stock 17 with undercut recesses 27 shown more clearly in Fig. 1. Screw-threaded adjusting stems 28 are threaded in the screw-threaded openings in the end portions of the stock 16 and are provided at their inner ends with heads 29 positioned in the undercuts or recesses 27, in such a way that the adjustment of the stems 28 in one direction or the other will either draw the slide member 24 towards the stock 17 or push it away from the stock. Knurled and nicked heads 30 are removably mounted upon the exposed outer ends of the stems 28, they being held rigidly with the stems by means of driven pins 31, which may be removed in order to permit removal of the heads from the stems, if desired. Removal of the heads, however, will probably not be necessary, but the construction in this respect is desirable in order in the first instance, when the parts are being assembled, to enable the outer ends of the screw-threaded stems 28 to be threaded outwardly into the screw-threaded openings of the stock 17 when the slide member 24 has been entered between the posts of each pair 18, 19 and 20, 21. When the stems have been screwed far enough, the screw-heads 30 are fixed rigidly thereupon and then the stems may be adjusted so as to give the desired adjustment to the slide member 24. When the desired adjustment of the slide member has been accomplished, lock-nuts 32, applied to the screw stems before the screw-heads 30 have been mounted upon them, are adjusted into a binding engagement with the adjacent portions of the stock 17, thereby to firmly hold the slide member 24 in a predetermined position.

The lateral wing portions 25 of slide-member 24 are provided, as more clearly shown in Fig. 3, with two flat faces 33, 33, at the opposite side of the slide member away from the stock 17. It is more clearly shown in Figs. 2 and 4 that these flat faces extend in inclined planes which converge in a direction away from the slide member, or rather away from the stock 17. These converging flat faces 33 determine the inclination of the parts which are mounted thereupon. A guide-seat 34 is formed transversely of one of the flat faces 33 and a guide-seat 35 is formed transversely of the other flat face 33. These seats are in the form of recesses in the slide-member 24, preferably of dove-tail shape in cross-section. Hence the faces 33 are undercut, and the recesses thus formed have their walls extending at right angles to the length of the slide member 24. It will be noted from Fig. 3 that the dove-tail recesses 34 and 35 are offset the one to the other. This is for a purpose to be hereinafter explained. The slide member 24 is bellied outwardly at its central portion, to provide sufficient metal for the formation of ample inclined faces 33 and to receive at one side of each of the recesses 34, 35 a binding screw 36, for securing certain parts in the recesses.

A pair of bifurcated slides 37, 38, having flat faces, extends transversely of the seats 34, 35. One leg or bifurcation of each slide 37, 38 is provided with an integral dove-tail projecting way 39 which is adapted to fit slidingly in a corresponding recess 34 or 35. The fit is a snug yet a loose enough one to permit lateral adjustment of each bifurcated slide 37, 38. It will be seen that the closed ends of the bifurcations of the slides are directed in the direction of the feed of the fibrous board A upon the roller or disk 15, and that lengthwise of each other the slides are offset similarly to the offsetting of the seats 34, 35.

The spaces between the bifurcations of the slides 37, 38 provide slots 40, one in each slide, and these slots have their walls parallel with each other and with the corresponding inclined face 33 of the slide member 24. Lengthwise of the bifurcated slide members, their inner faces rest upon and are guided upon the inclined faces 33 of the slide member 24. Inclined surfaces 20a upon each of the posts or legs 20, 21 are substantially co-planar with inclined surfaces 33 so as to permit adjustment of the bifurcated slides 37, 38 upon the inclined faces 33. Within slot 40 of slide 37 there is mounted a knife-edged cutting disk 41 and a similar cutting disk 42 is mounted in the slot of the slide member 38. These cutting disks are of exceedingly hard steel so as to endure in their work, and the opposite faces of each cutting disk are parallel the one with the other, each disk being of a substantial thickness so as to snugly fit the slot, yet the fit is loose enough at least to permit fairly rapid rotation of each cutting disk, the knife edges of which project a suitable distance beyond the slides supporting the disks. It will be noted that annular beveled surfaces 43 are formed at the inner sides of the edge portions of each cutting disk, these surfaces extending to the edges of the disks so as to provide them with sharp knife edges. An ample V-shaped throat is thereby provided between the closest points of approach to each other of the bevel-surfaces 43, as shown in Fig. 4.

Referring to Fig. 6 it is more clearly seen how each of the cutting disks or knives is mounted rotatably in the desired position. Each cutting disk is provided with a strong and fairly large journal shaft 44 which passes through a smooth hole 45 in the disk so as to provide a cylindrical bearing surface for the cutter upon shaft 44. Such a shaft 44 passes through a smooth hole in the outer bifurcation of each slide 37, 38, and then enters a threaded hole 47 extending into the projecting way 39, the corresponding portion of the journal shaft 44 being screw-threaded so that it may be firmly screwed into the hole 47. The outer end of each journal shaft 44 is provided with a large nicked head 49 which is adapted to firmly bear upon the outer bifurcation of each slide. It will be seen that the journal shafts 44 diverge away from the slide member 24 upon which they are mounted, the inclination of each shaft being fixed and determined by the inclination of the corresponding face 33, and such shaft extending at right angles to its corresponding face 33. When the parts are properly adjusted it will be seen that the flat outer faces of the cutting disks extend in planes which converge away from the stock of the cutting unit, that is to say these planes diverge away from the sides of the cutting unit. The outer flat face of each cutting disk will therefore be parallel with the corresponding inclined face of the slide member 24.

A thrust member 50 is rigidly secured by screws 51 to each of the outer faces 52 of the lateral wing portions 25 of the slide member 24. The screws for the thrust member 50 are arranged to each side of seat 34 and seat 35. The thrust members 50 are elongated and intermediately of the length thereof they are provided with outwardly projecting lugs 53 arranged in inclined planes with respect to the planes of the faces 52 upon which the thrust members are secured. Said lugs 53 are provided with screw-threaded holes to receive thrust screws 54, the inner ends of which abut the adjacent ends of the projecting ways 39 of slides 37, 38. By adjusting the thrust screws 54 the slides 37, 38 are adapted to be moved in one direction or the other, and when they are in the required position, such position is fixed by means of the set-screws 36.

Referring more particularly to Fig. 1, the beam or bar 14 is shown as provided with a dove-tail rib or projecting way 55 which as shown in Fig. 2 extends longitudinally of beam 14, so that other cutting units may be positioned along the beam. The stock or body 17 of the cutting unit 16 is provided with spaced back portions 56, 57 which extend transversely of the stock 17, and between them there is located a transverse recess 58 which is undercut in the back portion 57, while at the opposite side of the recess it has a surface inclined in the same direction on back portion 56 as the surface at the undercut side. It will be noted that the back portions 56, 57 are of different heights, the back portion 57 being lower than 56.

Adjustably screwed into the back portion 56 which is at the front side of the cutting unit with respect to the direction of feed of the board A, are binding screws 59 (only one of which is shown) and the inner ends of these are adapted to firmly bear upon a gib 60, whereby the dove-tail way 55 is firmly pressed upon by the gib 60 in securing the way 55 in the recess 58 of the stock 17. This gib 60 is located adjacent that side of recess 58 which inclines outwardly on the back portion 56. Preferably the same side of the recess is formed with a seat 61 for the corresponding edge of gib 60.

Screwed into the outer face of the lower back portion 57 is a set-screw 62 which is adjustable in such portion and which is maintained in the desired adjusted position by means of a binding screw 63 which enters the back portion 57 from a lateral side.

When the screw 62 is set as shown in Fig. 1, its end surface is level with the corresponding surface of the back portion 56. In this position of the set-screw 62 the cutting unit 16 may be set in the position illustrated in Fig. 1. In this position the cutting unit with the cutters 41, 42 are set so that a line through the center of the dove-tail way 35 will pass at right angles to its lower surface and through the center of the roll or disk 15, such line also passing midway of the closest points of the cutting edges of the cutters. The cutters 41, 42 would then cut a groove in varying materials which will fold more or less than a right angle according to the density and thickness of the stock material or board used, when the cutters are set at right angles to each other, or a different groove according to the angle between the faces of the cutters. A greater angle than ninety degrees will cut a wider groove which will fold further toward and beyond a right angle, that is the board along the line of the groove may be folded to acute angles.

It will be understood from Fig. 1 that the feed rollers 10, 11 push the board A between the roller or disk 15 and the cutters 41, 42, and that thereby the cutters and roller 15 are caused to rotate according to the speed and rotation of the rollers 10, 11. In the position shown in Fig. 1, the imaginary line before mentioned and which passes as explained through the dove-tail way 55 and through the axis of roller 15, indicates that at a point midway between, the closest points of the cutting edges are intersected by such line and that a groove will be cut in the board A whose sides are inclined according to the inclination of the cutters. When the cutters are so set, there is no tendency to push them together, but rather to push them apart, in cutting the shaving or chip C from the board, in the act of forming the groove B therein. As soon as the board A reaches the feed rollers 12, 13, these act to pull the board along and to continue the rotation of the cutters 41, 42.

In this connection reference may also be had to Fig. 2 from which it will be seen that the cutters 41, 42 are arranged in planes intersecting the roller or disk 15, which planes converge toward the roller so as to cut the groove along the path taken by the board A. In this connection it will also be understood that when the slide 24 has been adjusted and the slides 37, 38 have been adjusted and set for setting the cutters as desired with respect to their support, that in operation the closest points of the cutting edges of the cutters lie laterally across the line of the groove which is being cut and substantially in planes which are inclined to the axis of the roller 15.

Referring now to Fig. 8 it will be seen that the entire cutting unit 16 is disposed at an inclination. Such position is obtained by setting the screw 62 further into the stock 17 of the unit, so that when the unit is applied to the dove-tailed way 55 of the beam 14, the tightening up of the set-screw 59 onto the gib 60 will fix the cutting unit in a predetermined tilted position, which is determined by the screw 62 which constitutes a tilting screw. In a tilted position the cutters present advantages, which, if desired, may always be resorted to instead of having them on the imaginary line heretofore mentioned. That is to say, in any desired tilted position the cutters 41, 42 will be tipped downwardly in front and upwardly in the back. Such tipping causes the cutters to tend to pull apart, instead of having a tendency to press together as when set straight over the center of the roller 15, thereby positively keeping one cutter from dulling the other. Inasmuch as the cutters have been set to converge along their flat outer faces to say ninety-five degrees, as shown in Fig. 2 and 4, it is possible with the tilting of the cutters to cut a groove say with an angle of ninety degrees. Grooves of different angles may be cut by the same angular setting or with a different angular setting, say of ninety degrees, by tilting the cutting unit substantially as shown in Fig. 8. Here the degree of tilting which would be commonly resorted to has been somewhat exaggerated for the sake of clearness. However, when the cutters are tilted as indicated, a further advantage is obtained in that the chip or shaving removed from the groove in the board is drawn away from the latter if there is any tendency for it to adhere, but most important the chip is pulled away from the board upwardly, if the cutters work in a downward position, as shown, and the chip thus lifted must find its way out at a point above the closest points of approach of the cutting edges, the chip being discharged about as shown in Fig. 8, where it can be controlled and removed without damage to the board. In practice under the present disclosed specific machine the chip or shaving is simply pressed back into the groove by the end pair of feed rollers 12, 13, and as the chip has been fully detached from the board it is a very simple matter to control and remove it from the board. This, however, would not have to be done if the roller 15 were a positively driven roller and the rollers 10, 11, 12, 13 dispensed with.

The reasons why the cutters act as stated when they are tilted, are the following:

Looking at Fig. 1 it will be seen that the cutter 42 being inclined appears as an ellipse and the long axis of the ellipse is parallel with the path of the board. However, in Fig. 8, as indicated by dotted line, the major axis of the ellipse seen in viewing the tilted cutter 42 indicates that this major axis is not parallel with the path of feed of the board. The points of closest approach of the cutting edges of the cutters would hence be on a line at right angles to the major axis of the ellipse of cutter 42, which indicates that they are set slightly behind the vertical plane which passes through the axis of roller 15. This means that any lines passing through the cutters in a plane with the adjacent surface of the board will converge slightly from front to back. This furthermore means that if the cutters, for example, are set at ninety-five degrees, the forward edges of the cutters where they strike the board may easily be caused by the said tilted position of the cutters to cut a groove the walls of which are at an angle of ninety degrees. Inasmuch as the chip or shaving must pass over the closest points of approach of the cutters, which are now removed slightly to the rear, the chip is pulled away. Inasmuch as the chip or shaving is now forced to enter a wider opening between the cutters than the opening through which it passes out, the chip is somewhat compressed between the cutters in the act of forcing it out.

The setting of the cutters when tilted is graphically indicated somewhat roughly in the diagram, Fig. 9. Here two lines are seen to converge, these representing lines which would pass through the cutters in a plane coincident with the plane of the adjacent surface of the board. At the points a, a located where the board comes in contact with the cutting edges, the latter are more widely spaced apart than at the points b, b which indicate where the board leaves the cutters. This view is merely graphic and represents nothing in the way of proportions, as it is exaggerated for the sake of clearness.

It will be recalled that the slides 37, 38 are offset one in advance of the other. Advantages are taken of this arrangement to set one of the cutters in advance of the other. It has been found in practice that an easier cutting out of the chip or shaving is accomplished because the cut at one side of the chip is obtained slightly in advance of the cut at the other side, with less friction than when the cutters are set directly opposite each other, although the present invention is not restricted to such offsetting.

Obviously the invention as shown and described is capable of a wide range of modification without departing from the spirit thereof as defined in the scope of the appended claims.

What we claim as new is,—

1. In means for cutting a groove in fibrous board, the combination of a body having a pair of straight lateral, converging seats, each undercut and inclined lengthwise at the same angle, a pair of cutter slides independently movable one toward the other along the length of the seats and having guiding portions entering and complementary to the seats, a pair of opposed grooving cutters mounted on the slides in converging planes parallel with the converging seats, and means for independently adjusting and fixing each of the slides and its cutter whereby to obtain a variable lateral spacing of the cutters.

2. In means for cutting a groove in fibrous board, the combination of a body having a pair of straight lateral, converging seats, each inclined lengthwise at the same angle, a pair of bifurcated cutter slides independently movable one toward the other along the length of the seats, the bifurcations being parallel and extending transversely of the seats, a pair of opposed, rotary disk-cutters mounted in the bifurcations in converging planes parallel with the converging seats, and means for independently adjusting and fixing each of the slides and its cutter whereby to obtain a variable lateral spacing of the cutters.

3. In means for cutting a groove in fibrous board, the combination of a supporting stock, a slide member supported thereon and having a pair of outwardly converging seats inclined at the same angles, means for guiding the slide member from or toward the stock in the common direction in which the seats converge, a pair of cutter slides independently movable along the seats, a pair of opposed rotary disk-cutters mounted on the slides for an outward or inward movement therewith in converging planes parallel with the converging seats, means for adjusting and fixing the slide member in a plurality of positions from or toward the stock, and means for independently adjusting and fixing each of the pair of slides and its cutter whereby to obtain a variable lateral spacing of the cutters.

4. In means for cutting a groove in fibrous board, the combination of a supporting stock, a slide member supported thereon and having a pair of straight, outwardly converging seats, inclined at the same angles, means for guiding the slide member rectilinearly from or toward the stock, in the common direction in which the seats converge, a pair of cutter slides independently movable along the seats, and being otherwise immovable, a pair of opposed rotary disk-cutters mounted on the slides against lateral movement for an outward or inward movement therewith in converging planes parallel with the converging seats, means for adjusting and fixing the slide member in a plurality of positions from or toward the stock, and means for independently adjusting and fixing each of the pair of slides and its cutter whereby to obtain a variable lateral spacing of the cutters.

5. In means for cutting a groove in fibrous board, the combination of a supporting stock, a slide member supported thereon and having a pair of depressed, outwardly converging seats, inclined at the same angles, means for guiding the slide member from or toward the stock, in the common direction in which the seats converge, a pair of cutter slides dovetailed into and independently movable along the seats, a pair of opposed rotary disk-cutters mounted on the slides for an outward or inward movement therewith in converging planes parallel with the converging seats, means for adjusting and fixing the slide member in a plurality of positions from or toward the stock, and means for independently adjusting and fixing each of the pair of slides and its cutter whereby to obtain a variable lateral spacing of the cutters.

6. In means for cutting a groove in fibrous board, the combination of a supporting stock having two pair of posts which are suitably spaced apart the one from the other, a slide member guided in the spaces of the two pair, and having lateral portions guided in the remaining spaces separating the two pair, the slide member also having a pair of inclined seats extending from the lateral portions and converging outwardly at the same angles, a pair of cutter slides independently movable along the seats, a pair of opposed rotary disk-cutters mounted on the slides for an outward or inward movement therewith in converging planes parallel with the converging seats, means located beyond the two pair of posts, and cooperatively engaging the stock and the slide member, for adjusting and fixing the slide member in a plurality of positions from or toward the stock, and means positioned at the outer edges of the lateral portions for independently adjusting and fixing each of the pair of slides and its cutter whereby to obtain a variable lateral spacing of the cutters.

7. In means for cutting a groove in fibrous board, the combination of a cutter support, a stock or body, a pair of opposed, rotary disk cutters mounted on the stock in converging planes so that the closest portions of their edges are directed away from the stock, means for rigidly mounting the stock on the support, and means for adjusting and maintaining the stock and cutters at varying degrees of inclination with respect to the support.

8. In means for cutting a groove in fibrous board, the combination of a cutter support, a stock or body, a pair of opposed, rotary disk cutters mounted on the stock in converging planes so that the closest portions of their edges are directed away from the stock, the stock having mounting means at its back and also means adapting the stock and cutters to be attached at different angles to the support.

9. In means for cutting a groove in fibrous board, the combination of a cutter support, a stock or body, a pair of opposed, rotary disk cutters mounted on the stock in converging planes so that the closest portions of their edges are directed away from the stock, the stock having mounting means at its back and also an adjustable back stop adapting the stock and cutters to be attached at different angles to the support.

10. In means for cutting a groove in fibrous board, the combination of a cutter support, a stock or body, a pair of opposed, rotary disk cutters mounted on the stock in converging planes so that the closest portions of their edges are directed away from the stock, the stock having spaced back portions of different heights and the space enabling the stock to be mounted on the support, and the lower of the back portions being provided with an adjustable stop to engage such support.

11. In means for cutting a groove in fibrous board, the combination of a board supporting roller, a cutter support, a pair of opposed, rotary disk-cutters, means for maintaining the cutters in fixed planes intersecting the roller and convergingly toward the roller, and means for adjusting the so maintained cutters to cut bevel sided grooves of varying degrees of angularity in board, the closest cutting points laterally of the cutters being located one in advance of the other along the line of the groove to be cut.

12. In means for cutting a groove in fibrous board, the combination of a board supporting roller, a cutter support, a pair of opposed, rotary disk-cutters, means for maintaining the cutters in fixed planes intersecting the roller and convergingly toward the roller, means for adjusting the cutters in their maintained planes, and means for adjusting the so maintained cutters to cut bevel sided grooves of varying degrees of angularity in boards.

13. In means for cutting a groove in fibrous board, the combination of a board supporting roller, a cutter support, a pair of opposed, rotary, disk-cutters arranged in planes intersecting the roller and convergingly toward the roller so as to cut along the path taken by the board, and means for mounting the cutters so as to be rockable about the plane of feed of the board.

14. In means for cutting a groove in fibrous board, the combination of a board supporting roller, a cutter support, a pair of opposed, rotary, disk-cutters arranged in planes intersecting the roller and convergingly toward the roller so as to cut along the path taken by the board, means for maintaining the cutters in their converging planes, and means for mounting the cutters so as to be rockable about the plane of feed of the board.

JOHN T. ROBINSON.
THEODORE A. SCHWAMB.